July 29, 1952
G. F. SCHRADER
2,605,449
PULSE GENERATOR
Filed June 3, 1948
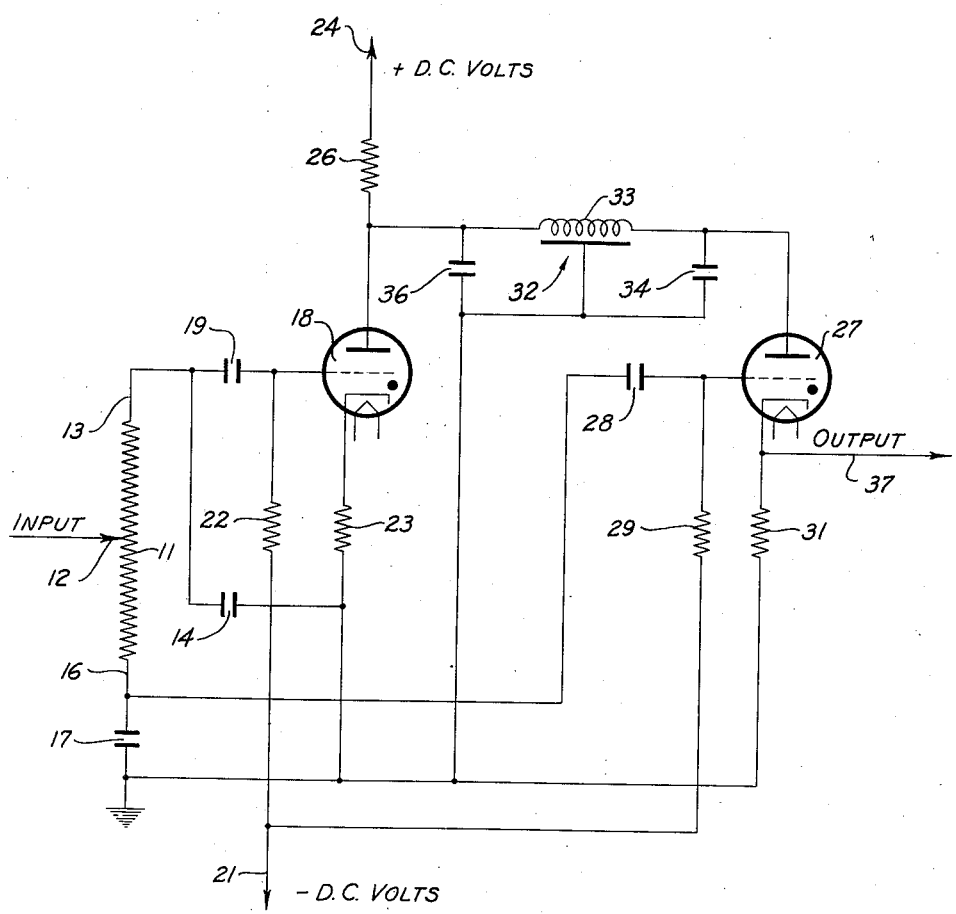
INVENTOR.
GEORGE F. SCHRADER
BY
ATTORNEY Patented July 29, 1952

2,605,449

UNITED STATES PATENT OFFICE 2,605,449

PULSE GENERATOR

George F. Schrader, Richmond, Calif., assignor to the United States of America as represented by the United States Atomic Energy Commission Application June 3, 1948, Serial No. 30,850

5 Claims. (Cl. 315—230)

This invention relates to an electronic circuit and more particularly to a pulse generating network for producing pulses of variable duration.

In general, the type of electronic network proposed comprises combinations of differentiating circuits, amplifying circuits, clipping circuits, and multivibrator circuits, which become complex in structure and costly to manufacture. It is proposed by this invention to provide a pulse-generator capable of developing pulses of variable duration using a pair of gaseous discharge tubes, the anodes of which are interconnected with an artificial transmission line section, and the control grids of which are energized by means of resistance-capacitance integrating circuits.

It is therefore an object of this invention to provide a new and improved pulse generating circuit.

Another object of the invention is to provide a simplified and less costly pulse generating circuit.

Still another object of the invention is to provide a pulse generating circuit capable of producing pulses of variable duration which can be controlled by a single variable element over a substantially large range.

A further object of the invention is to provide a pair of gaseous discharge tubes controlled to discharge a section of artificial transmission line and adapted to provide a pulse of variable duration in response to an input pulse.

Other objects and advantages will be apparent in the following description and claims considered together with the accompanying drawing in which the figure is a schematic wiring diagram embodying the invention and is the sole drawing thereof.

Referring to the drawing in detail, there is shown a potentiometer 11 having its variable connection 12 connected to an external source of square waves of voltage. One end 13 of the potentiometer 11 is connected to ground through a condenser 14 and the other end 16 is connected to ground through another condenser 17. The potentiometer end 13 is connected to the control grid of a first triode gaseous discharge tube 18 through a coupling condenser 19. The control grid of the tube 18 is connected to a suitable negative unidirectional voltage 21 through a resistor 22. Other connections of the tube 18 are as follows: the cathode is connected to ground through a resistor 23, and the anode is connected to a suitable positive source of unidirectional voltage 24 through a resistor 26. The potentiometer end 16 is connected to the control grid of a second triode gaseous discharge tube 27 through a coupling condenser 28. The control grid of this tube 27 is further connected to the negative voltage source 21 through a resistor 29. Other connections of the tube 27 are as follows: the cathode is connected to ground through a resistor 31 and the anode is connected to one end of an artificial transmission line 32 comprising an inductance 33, and two condensers 34 and 36. The other end of the transmission line 32 is connected to the anode of the tube 18. The condenser 34 is connected from one side of the inductance 33 to ground and the condenser 36 is connected from the other side of the inductance 33 to ground. An output lead 37 is connected to the cathode of the tube 27 and serves as a source of output voltage for the circuit.

Now consider the operation of the invention with the sources of unidirectional voltages 21 and 24 suitably energized and with a square wave of voltage impressed at the adjustable element 12 of the potentiometer 11. For proper operation of the circuit, the inductance and capacitance of the artificial transmission line 32 are chosen so that the traveling wave time thereof is equal to the duration of the input square wave of voltage and the values of the cathode resistors 23 and 31 of the tubes 18 and 27, respectively, are so chosen as to be equal to the characteristic resistance of the artificial transmission line 32. The values of these elements can be calculated readily by using well-known transmission line formulas; that is, the traveling wave time is equal to the square root of the product of the inductance 33 and capacitance 34 and 36 of the artificial transmission line 32 and the characteristic resistance of the line 32 is equal to the square root of the quotient of the inductance 33 divided by the capacitance 34 and 36. With the above conditions satisfied and the adjustable element 12 of the potentiometer 11 positioned near the potentiometer end 13, the combination of the capacitance of the condenser 14 and the resistance of the potentiometer 11 forms an integrating network for the input square wave of voltage. The same occurs at the end 16 of the potentiometer 11 in conjunction with the condenser 17. Thus, it is seen that sawtooth waves of voltages are coupled to the control grids of the two tubes 18 and 27 by the condensers 19 and 28 respectively. Since the adjustable arm of the potentiometer is, in this instance, positioned near the end 13 thereof, the slope of the sawtooth wave at the control grid of the tube 18 will be greater than that at the control grid of the tube 27 and the firing voltage of the tube 18 will be reached sooner than that of the tube 27.

During the time both of the tubes 18 and 27 are nonconducting, the artificial transmission line 32 becomes charged to a voltage equal to the positive voltage of the source 24 through the resistor 26 which has a high value in comparison with the characteristic resistance of the line 32. Now, with the adjustable element 12 of the potentiometer 11 positioned as stated above, the tube 18 conducts soon after the occurrence of a square wave of voltage at the input and the voltage of the line 32 falls to one-half of its original value with a negative voltage wave equal to one-half the original value travels down the line 32 toward the tube 27. If the voltage at the control grid of the tube 27 never becomes sufficiently positive to fire the tube 27, the traveling wave, after the time determined by the inductance and capacitance of the line 32 as described previously, is reflected in such a manner that the anode voltage of the tube 27 becomes zero. Then after a time equivalent to the travel time computed above, the anode voltage of the tube 18 becomes zero and the tube 18 ceases to conduct. Under this circumstance the tube 27 does not conduct, therefore there can be no voltage developed across the resistor 31 and the output voltage of the circuit is zero.

Under the same circumstances as outlined above, but with the adjustable element 12 positioned sufficiently toward the end 16 of the potentiometer 11 that the tube 27 becomes conductive prior to the reflection of the traveling wave caused by the earlier conduction of the tube 18, a second traveling wave of voltage of equal magnitude is developed traveling in the opposite direction. The tube 27 then continues to conduct until the time when the first traveling reaches the end of the line 32 nearest the tube 27, at which time the anode voltage of the tube 27 drops to zero. Thus, there is a positive voltage developed across the resistor 31 from the time the tube 27 starts to conduct until the anode voltage of the tube becomes zero and the tube is cut off.

Now, with the adjustable element 12 of the potentiometer 11 positioned at the center of the potentiometer, sawtooth voltages of equal slope and magnitude are impressed at the control grids of the tubes 18 and 27. It can be seen from this and the foregoing that both of the tubes 18 and 27 will thus start to conduct at the same time sending a negative wave of voltage traveling across the line 32 from each end. The tubes will conduct for the time determined by the inductance and capacitance of the line 32, and will be simultaneously cut off when the line is discharged and an output voltage during this time will be developed at the output lead 37.

If the adjustable element 12 of the potentiometer 11 is moved from the center position to a position nearer the end 16 of the potentiometer, the tube 27 will conduct first, having the sawtooth voltage of greater slope impressed at the control grid. In this sequence of operation, which is analogous to that described above, traveling waves are started across the line 32 to discharge the line and cut off the tubes 18 and 27. In this instance the tube 27 conducts from the time its control grid becomes sufficiently positive until a time, determined by the inductance and capacitance of the line 32, later.

Now, with the adjustable element 12 of the potentiometer 11 very near the end 16 of the potentiometer, the tube 27 will conduct for a period twice as long as the traveling wave time of the line 32. This occurs in a manner analogous to the first condition discussed above; that is, the tube 27 conducts during the time it takes for the traveling wave of voltage to go from one end of the line 32 to the other and be reflected back.

From the foregoing it is seen that a square wave voltage input can be utilized by this circuit to generate an output pulse of voltage of variable duration between zero and twice the traveling wave time for the artificial transmission line.

While the salient features of this invention have been described in detail with respect to one embodiment it will, of course, be apparent that numerous modifications may be made within the spirit and scope of the invention and it is therefore not desired to limit the invention to the exact details shown except insofar as they may be defined in the following claims.

What is claimed is:

1. In an electronic circuit of the class described, the combination comprising a pair of gaseous discharge tubes having at least a cathode, a control grid, and an anode, a resistor connected in the cathode circuit of each of said tubes an artificial transmission line connected between said anodes for storing energy, a pair of resistance-capacitance integrating networks having a common variable input connection and separate outputs, the control grid of each of said tubes being connected to the output of one of said integrating networks, and means for charging said line, whereby the conduction of said tubes is controlled to discharge said line in response to a square wave of voltage at said input connection and to produce an output voltage of variable duration at one of said cathodes.

2. In an electronic circuit of the class described, the combination comprising a pair of gaseous discharge tubes having at least a cathode, a control grid, and an anode, an artificial transmission line connected between said anodes for storing energy, a pair of integrating circuits comprising a potentiometer, and two condensers, one of said condensers being connected to each end of said potentiometer, a source of square waves of voltage connected to the adjustable element of said potentiometer, one of said integrating circuits being connected to each of said control grids for controlling the operation of said tubes in response to said input voltage and the position of said variable element, and means for charging said line, whereby output voltages of variable duration are produced at one of said cathodes.

3. In an electronic circuit of the class described, the combination comprising an input and an output, a pair of variable integrating circuits having a common connection to said input, a pair of gaseous discharge tubes having at least a cathode, a control grid, and an anode, one of said control grids connected to each of said integrating circuits, an artificial transmission line connected between said anodes, and means for charging said line, one of said cathodes being connected to said output.

4. In an electronic circuit for producing rectangular voltages having variable duration, the combination comprising a source of rectangular voltages, a potentiometer having its adjustable element connected to said source, a separate condenser connected between each end of said potentiometer and ground forming a pair of integrating circuits, whereby the voltage developed across each of said condensers is a triangular wave having a maximum voltage which is variable by the adjustable element of said potentiometer, a first and second gaseous discharge tubes having a cathode, a control grid, and an anode, means connected to said control grids for normally biasing said tubes beyond cut-off, means for coupling the voltage across said condensers to the control grids of said tubes, a section of artificial transmission line connected between the anodes of said tubes, charging means connected jointly to the anode of said first tube and to one end of said artificial transmission line, and an output connection connected to the cathode of said second tube.

5. In an electronic circuit of the class described, the combination comprising a potentiometer having an adjustable element serving as an input connection for square waves of voltage, a first condenser connected between one end of said potentiometer and ground, a second condenser connected between the other end of said potentiometer and ground, a first gaseous triode tube having the cathode thereof connected to a resistor which is in turn connected to ground, a first coupling condenser connected between the control grid of said first tube and the junction of said potentiometer and said first condenser, means also connected to the control grid of said first tube for biasing the tube beyond cut-off, a dropping resistor connected to the anode of said first tube and serving as a connection for a positive unidirectional operating voltage, a second gaseous triode tube having the cathode thereof connected to a resistor which is in turn connected to ground, a second coupling condenser connected between the control grid of said second tube and the junction between said potentiometer and said second condenser, means also connected to the control grid of said second tube for biasing the tube beyond cut-off, an inductor having one end connected to the anode of said first tube and the other end connected to the anode of said second tube, a condenser connected between one end of said inductor and ground, a condenser connected between the other end of said inductor and ground, and an output lead connected to the cathode of said second tube.

GEORGE F. SCHRADER.

REFERENCES CITED

The following references are of record in the file of this patent:

UNITED STATES PATENTS

| Number | Name | Date |
|---|---|---|
| 2,197,414 | Place | Apr. 16, 1940 |
| 2,301,195 | Bradford | Nov. 10, 1942 |
| 2,301,220 | Lowe | Nov. 10, 1942 |
| 2,409,897 | Rado | Oct. 22, 1946 |
| 2,445,888 | Rado | July 27, 1948 |
| 2,446,838 | Lawrence, Jr. | Aug. 10, 1948 |
| 2,458,574 | Dow | Jan. 11, 1949 |
| 2,496,543 | Kanner | Feb. 7, 1950 |